United States Patent
Goebel et al.

(10) Patent No.: US 6,306,303 B1
(45) Date of Patent: Oct. 23, 2001

(54) WASHING PROCESS WITH WASTE WATER RECYCLING

(75) Inventors: Irmhild Goebel, Duesseldorf; Walter Guhl, Haan; Hans-Josef Wieser, Duesseldorf, all of (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 09/341,280
(22) PCT Filed: Dec. 19, 1997
(86) PCT No.: PCT/EP97/07170
§ 371 Date: Sep. 28, 1999
§ 102(e) Date: Sep. 28, 1999
(87) PCT Pub. No.: WO98/30746
PCT Pub. Date: Jul. 16, 1998

(30) Foreign Application Priority Data

Jan. 7, 1997 (DE) .............................................. 197 00 155

(51) Int. Cl.$^7$ ...................................................... C02F 3/30
(52) U.S. Cl. ............................................................ 210/622
(58) Field of Search .................................... 210/917, 708, 210/721, 703–707, 167, 622, 758, 760, 733

(56) References Cited

U.S. PATENT DOCUMENTS 3,841,116   10/1974   Klein et al. ........................... 68/12 R

FOREIGN PATENT DOCUMENTS

| 39 10 089 | 10/1989 | (DE) . |
| 41 24 915 | 1/1993 | (DE) . |
| 44 07 734 | 4/1995 | (DE) . |
| 0 578 006 | 1/1994 | (EP) . |
| 2 589 895 | 5/1987 | (FR) . |

OTHER PUBLICATIONS

Rompps Chemie Lexikon, Band 2 (1990) pp. 1339–1342.

*Primary Examiner*—Chester T. Barry
(74) *Attorney, Agent, or Firm*—John E. Drach; Steven J. Trzaska

(57) ABSTRACT

A process for washing fat- or dye-soiled materials involving: (a) providing a fat- or dye-soiled material; (b) providing an aqueous detergent-containing liquor; (c) contacting the fat- or dye-soiled material with the aqueous detergent-containing liquor, thus forming a washed material and wash wastewater; (d) providing a source of rinse water; (e) rinsing the washed material with the rinse water, at least once, thus forming rinsed material and rinse wastewater; (f) collecting both the wash and rinse wastewater; (g) chemically pretreating the collected wash and rinse wastewater by contacting it with a compound selected from the group consisting of a demulsifier, an oxidizing agent and mixtures thereof to form waste particles; (h) mechanically removing the waste particles from the collected wash and rinse wastewater by flotation or sedimentation to form prepurified wash and rinse wastewaters; (i) biologically treating the prepurified wash and rinse wastewater by introducing it into a fixed-bed reactor containing activated sludge to form a mixture of treated wastewater and sludge; (j) separating the treated wastewater from the sludge; and (k) recirculating the treated wastewater back into the aqueous detergent-containing liquor, the rinse water, or both.

15 Claims, 1 Drawing Sheet

WASHING PROCESS WITH WASTE WATER RECYCLING

BACKGROUND OF THE INVENTION

This invention relates to a process for cleaning soiled materials, the wastewaters from the process being chemically, mechanically and biologically treated and then returned to the process.

The industrial cleaning of soiled materials is normally carried out in washing machines using a detergent-containing aqueous liquor. After the actual washing process, the washed material is repeatedly rinsed with water and then dried and further processed. In this process, the disposal of the wastewater accumulating, which is polluted with detergent residues and other ingredients, represents a considerable cost factor. In the washing of feather or downs or in the washing of raw hide for leather manufacture, the wastewater is polluted, for example, with large amounts of emulsified fat. In the washing of dyed cotton fabrics, for example in mechanical stone-wash washing with pumice stones or in the washing of blue jeans, the wastewater contains dissolved and/or dispersed dyes and fiber residues.

In view of stricter anti-pollution legislation, the untreated wastewater is no longer allowed to leave the process so that treatment of the wastewater is unavoidable. The high consumption of freshwater for the treatment process, especially in countries and regions with limited water resources, is also a considerable cost factor.

Accordingly, there is a need for a cleaning process for soiled materials which would involve minimal water consumption and hence could be operated less expensively than known processes and which, at the same time, would lead to reduced environmental pollution by wastewater.

SUMMARY OF THE INVENTION

The present invention therefore relates to a washing process for soiled materials in which the material to be washed is contacted with an aqueous detergent-containing liquor and then rinsed at least once with water, the wastewater from the wash and rinse cycles is collected, chemically, mechanically and biologically treated and then returned to the washing process, characterized in that the treated wastewater is used both for the rinse cycle and, after addition of the detergent, for the wash cycle.

The process according to the invention is particularly suitable for washing fat-soiled material, the wastewater being treated by A) complete or partial treatment in a fat separator after addition of a demulsifier and then
B) mechanical prepurification by flotation and/or sedimentation before the biological treatment step.

In the context of the invention, fat-soiled material is understood to be material which contains 0.3 to 16% by weight of fat, based on the weight of the material. The term "fat" in the context of the invention encompasses natural or synthetic glycerol esters of higher fatty acids as described, for example, in Römpps Chemie Lexikon, Vol. 2, pages 1339–1342, 1990. The process according to the invention is particularly suitable for cleaning feathers or downs. Besides fat, feathers and downs contain skin particles, blood, droppings, vegetable impurities and large quantities of dust. Fat-soiled material in the sense of the present invention also occurs in the washing of leather, especially raw hides.

However, the process according to the invention is also suitable for washing dye-soiled material, i.e. in the context of the invention material which releases dyes into the wastewater during washing. In this case, the wastewater is treated by complete or partial chemical and mechanical prepurification by a) reaction with a suitable oxidizing agent and then
b) flotation and/or sedimentation before the biological treatment step.

Materials which release dyes into the wastewater include, for example, freshly dyed cotton fabrics or other textiles where excess dye is to be removed by washing as, for example, in mechanical stone-wash washing with pumice stones or in the washing of blue jeans.

The soiled material is washed in a suitable washing machine, for example a cylinder washing machine or a washer-extractor. Washing is normally carried out at temperatures of 5° C. to 60° C. However, feathers are preferably washed with cold water at temperatures of 20° C. to 30° C. while blue jeans are normally washed at up 60° C.

DETAILED DESCRIPTION OF THE INVENTION

Figure 1:
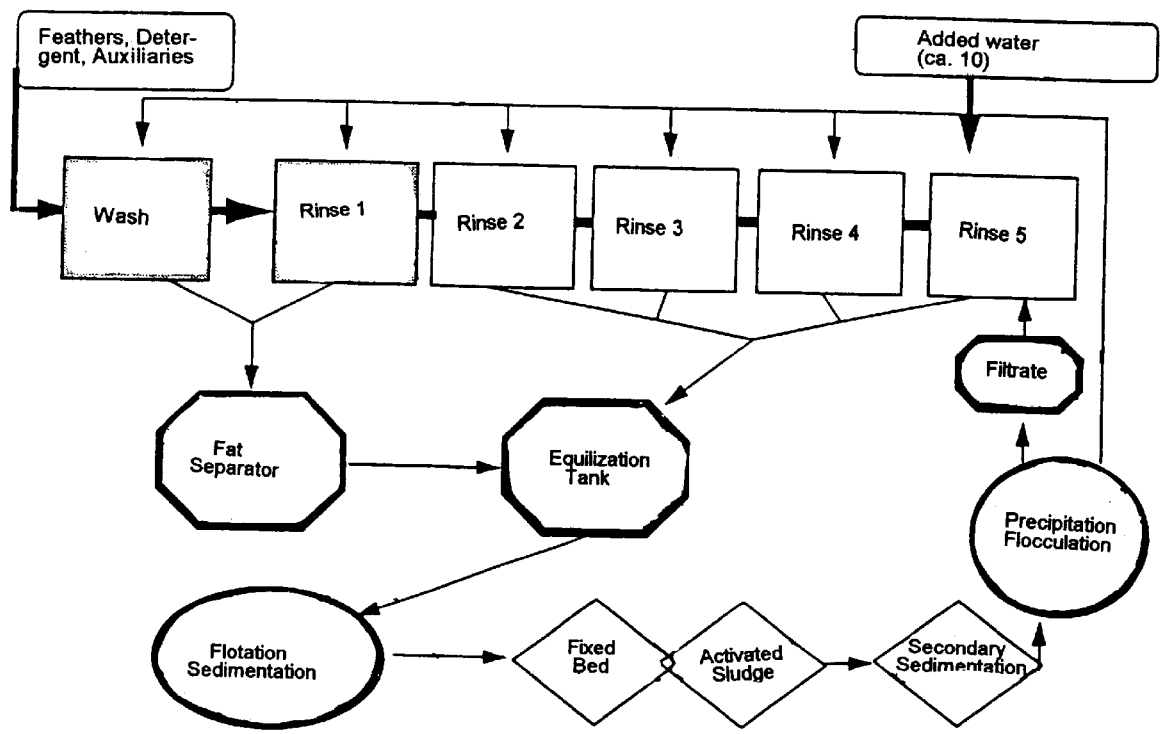
FIG. 1 is a flow chart showing the steps of the claimed process.

Detergents suitable for cleaning the material include any of the biodegradable types known to the expert for this purpose. These detergents normally contain anionic, cationic and/or nonionic surfactants. It is of particular advantage to use detergents based on nonionic surfactants, for example $C_{7-15}$ fatty alcohols which have been reacted with 3 to 10 mol of ethylene and/or propylene oxide per mol of fatty alcohol. Other suitable detergent ingredients are diethylene glycol ethers, more particularly diethylene glycol monobutyl ether, and reaction products of ethylene and/or propylene oxide with fatty acids. Reaction products of $C_{10-20}$ fatty acids with 8 to 12 mol of ethylene oxide per molecule of fatty acid are particularly suitable.

The quantity of detergent used depends mainly on the degree of soiling of the material. The detergent is preferably used in quantities of 0.1 to 5% by weight, based on the weight of the material to be washed. In addition, the process according to the invention is designed in such a way that the quantity ratio of material to water is preferably between 1:5 and 1:15. Besides the detergents described above, other substances may be used in the process according to the invention in the washing and rinsing steps, including for example antistatic agents, odor inhibitors, bleaching agents, water softeners, blueing agents and bacteriostatic agents. These auxiliaries are added to the wash or rinse liquor in the quantities known to the expert, normally between 0.1 and 3% by weight, based on the weight of the material to be washed.

The process according to the invention is distinguished by the fact that the water used in the washing and rinsing steps contains treated wastewater which has been returned to the process. The consumption of freshwater and hence the washing costs are thus reduced. The water used in the process preferably contains up to 80% by weight of treated wastewater. However, the process may also be designed with advantage in such a way that the proportion of freshwater that has to be added to the circuit can be reduced to 10% by weight. The wastewater can thus be almost completely recovered. The water losses are mainly attributable to evaporation and to the removal of water in the moisture of the washed material after undergoing the washing process.

After the washing step, the washing water is pumped off and the material is rinsed with water. Detergent residues and fat or dyes and optionally solids adhering to the washed material are rinsed off in the rinsing step until the rinsing water is clear. This may be done in the washing machine itself or in a separate rinsing unit. The rinsing steps are preferably carried out in the washing machine.

The quantity ratio of washed material to rinsing water is preferably between 1:5 and 1:40 per rinse cycle. The washed material is rinsed with water at least once but preferably several times, more particularly between 3 and 6 times.

The washing process according to the invention is advantageously designed in such a way that between 3 and 6 cubic meters of water are required for the complete washing of 100 kg of material, i.e. for the washing and rinsing steps.

The wastewaters from the rinse cycles are also collected, combined with the wastewater of the washing step, chemically, mechanically and then biologically treated and returned to the process. To this end, the wastewaters from the washing and rinsing steps are first completely or partly prepurified both chemically and mechanically.

In the case of fat-containing soils, a suitable chemical which breaks up the fat/water emulsion is first added to the wastewater. Iron salts, such as $FeCl_3$, are preferably used as demulsifiers, although $AlCl_3$ or mixtures with iron salts may also be used. The demulsifier is used in quantities of preferably 1 to 10 $g/m^3$ wastewater and more preferably 2 to 5 $g/m^3$ wastewater.

The chemically treated wastewater is then introduced into a fat separator. Any units and equipment known to the expert may be used for this purpose. The fat globules separated off float on the surface of the water and are mechanically removed.

The wastewater thus prepurified is then freed from any solids present by flotation and/or sedimentation. It is preferably subjected both to sedimentation to remove coarse solids and to flotation to remove fine-particle soil, for example feather dust. This step may also be carried out in flotation or sedimentation units known to the expert.

If materials which release dyes to the wastewater are washed, the chemical treatment is carried out by first adding to the wastewater a suitable oxidizing agent which reacts with the dyes dissolved or dispersed in the water. Ozone is preferably used as this oxidizing agent in the process according to the invention.

The chemically and mechanically pretreated wastewater is then transferred to a biological treatment stage in which the wastewater is free from the surfactant residues. The biological treatment stage normally consists of a fixed-bed reactor and activated sludge. A degradation of more than 95% by weight of the surfactants is normally achieved in such treatment units. The treated wastewater is then introduced into a secondary sedimentation tank to separate the sludge from the water. The sludge accumulating there is dewatered and may then be put to use, for example as an agricultural fertilizer.

The wastewater thus treated may now be reused for the wash and rinse cycles. However, it has proved to be of advantage further to treat the wastewater—after the biological stage—in an aftertreatment step carried out by flocculation in the presence of a flocculation aid. Bacterial mass or activated sludge discharged from the biological treatment stage is removed by this aftertreatment. The flocculation agent used in this aftertreatment may be selected from any of the compounds known to the expert for this purpose, anionically modified polyacrylamides preferably being used. To this end, the flocculating agent is used in quantities of 0.1 to 2 $g/m^3$ wastewater and preferably in quantities of 0.5 to 1 $g/m^3$ wastewater. However, it can also be of advantage to filter the wastewater following the aftertreatment before it is returned to the wash and rinse cycles. This filtered water is particularly suitable for the final rinse cycle of the process.

In a particularly preferred embodiment of the process according to the invention, only the wastewater of the wash cycle and the first rinse cycle is chemically pretreated and the used water of the other rinse cycles is collected in an equalization tank. The chemically pretreated wastewater is combined with the water from the equalization tank and the combined wastewaters are then further prepurified by flotation and/or sedimentation and subsequently delivered to the biological treatment stage.

It can also be of advantage to design the process in such a way that the wastewater of the washing step is treated and the wastewater thus treated is used in countercurrent in the rinsing units. The wastewater from the rinsing units is then used for washing after addition of the detergents and other auxiliaries required and subsequently resubjected to the treatment process.

The process according to the invention enables soiled materials to be inexpensively washed. The materials are generally washed in batches. The wastewater accumulating is treated, being circulated—preferably continuously—to this end. However, to ensure that the biological treatment stage retains its cleaning effect, nutrient-containing water has to be continuously passed through this treatment stage. Accordingly, the problem arises of designing the process in such a way that, even where the level of pollution by waste matter is low and in non-operational periods, the biological treatment stage retains its cleaning effect because the bacterial lawn and/or the activated sludge would soon lose activity without sufficient nutrients from the wastewater. Accordingly, it has proved to be of advantage to design the process in these periods in such a way that the water is circulated between the equalization tank and the biological treatment stage. In order to retain the activity of the bacterial lawn or the bacterial flocs, a suitable food for bacteria is added in sufficient quantities to the water. This food provides the bacteria with the missing nutrients, particularly nitrogen and phosphorus.

EXAMPLE

The washing of feathers is described in the following as an example of the washing process according to the invention.

FIG. 1 is a flow chart of the process.

The following quantities of water were used to wash 100 kg of feathers:

1000 l of water in the washing step
1000 l of water in the 1st rinse
500 l of water in the 2nd rinse
500 l of water in the 3rd rinse
500 l of water in the 4th rinse
1000 l of water in the 5th rinse.

The wash and rinse cycles were carried out in a washing machine. The ratio of washing water to feathers was 1:10. The feathers were soiled with solids (feather dust etc.) and about 6.5% fat. About 0.5 to 1% fat remained on the feathers after washing so that ca. 5.5 to 6.0 g of fat entered 1 l of wash liquor. If the fat is assumed to be based on stearic acid, 1 g of fat corresponds to ca. 750 mg org. C and 6 g of fat to ca. 4500 mg org. C. The wash liquor contained 3 kg of detergent and 0.5 kg of auxiliaries per 100 kg of feathers. The detergent contained 70% of organic material of which about two thirds are org. C: accordingly, 3 g of detergent contain 1400 mg org. C. The auxiliary contains 50% organic material of which about two thirds are org. C; accordingly, 0.5 g of auxiliary contains 200 mg org. C.

1 l of wash liquor contains 4500 mg org. C from fat, 1400 mg of org. C from the detergent and 200 mg org. C from the auxiliary, making a total of 6100 mg org. C.

<3 g/l fat, <1 g/l detergent ingredients, ≦0.2 g/l auxiliary ingredients and various quantities of solids were removed from the wash liquor and rinsing water of rinse 1. They were introduced into the fat separator after demulsification with a demulsifier based on metal salt (Microfloc EFW, a product of Henkel KGaA). After fat separation, the wastewater still contained <1 mg/l fat. The other water ingredients were 20–30% removed, leaving 800 mg/l detergents ingredients, 150 mg/l auxiliary ingredients and various quantities of solids.

The following maximum quantities of org. C remained in 1 l pretreated wastewater: 0.7 mg from fat, 500 mg from detergent and 100 mg from auxiliary, making a total of 600 mg.

The pretreated wastewater (from the wash cycle and rinse 1) and the wastewater of the other rinses were combined in an equalization tank and then subjected to flotation/sedimentation. The combination of the two wastewaters changed the contents of the wastewater as follows:

|  | Substance [mg/l] | Org. C [mg/l] |
| --- | --- | --- |
| Fat | 0.5 | 0.3 |
| Detergent | 350 | 225 |
| Auxiliary | 70 | 45 |
| Total | 270 |  |

The wastewater with these ingredients was freed from the solids in the flotation/sedimentation stage. This wastewater was introduced into an immersion-type bacteria bed reactor for biological treatment. This reactor consists of a fixed-bed reactor (wheels with upgrowth) and activated sludge. Given a holding time of about 12 h, the biological degradation can assumed to be >>95%.

After the biological treatment, the following C contents were obtained per liter of wastewater: 0.3 mg from fat, 45 mg from detergent and 9 mg from auxiliary, making a total of <55 mg.

The treated wastewater from the activated-sludge stage was introduced into a secondary sedimentation tank to separate the sludge from the water. Flocculation/precipitation in the presence of a flocculant based on an anionically modified polyacrylamide was then carried out for further purification. The water thus reconditioned was directly used for the wash cycle and for rinses 1 to 4. The remaining water was filtered for further purification and desalting. It was then used for the 5th rinse cycle. The water loss occurring was made up with freshwater (ca. 10%) in the 5th rinse.

What is claimed is:

1. A process for washing fat- or dye-soiled materials comprising:
    (a) providing a fat- or dye-soiled material;
    (b) providing an aqueous detergent-containing liquor;
    (c) contacting the fat- or dyesoiled material with the aqueous detergent-containing liquor, thus forming a washed material and wash wastewater;
    (d) providing a source of rinse water;
    (e) rinsing the washed material with the rinse water, at least once, thus forming rinsed material and rinse wastewater;
    (f) collecting both the wash and rinse wastewater;
    (g) chemically pretreating the collected wash and rinse wastewater by contacting it with a compound selected from the group consisting of a demulsifier, an oxidizing agent and mixtures thereof, to form chemically pretreated wash and rinse wastewater containing waste particles dispersed therein;
    (h) mechanically removing the waste particles from the chemically pretreated wash and rinse wastewater by flotation or sedimentation to form prepurified wash and rinse wastewaters;
    (i) biologically treating the prepurified wash and rinse wastewater by introducing it into a fixed-bed reactor containing activated sludge to form a mixture of treated wastewater and sludge;
    (j) separating the treated wastewater from the sludge; and
    (k) recirculating the treated wastewater back into the aqueous detergent containing liquor, the rinse water, or both.

2. The process of claim 1 wherein the fat- or dye-soiled material is a fat-soiled material.

3. The process of claim 2 wherein the compound of (g) is a demulsifier.

4. The process of claim 3 wherein the demulsifier is selected from the group consisting of an iron salt, an aluminum salt and mixtures thereof.

5. The process of claim 3 wherein the demulsifier is used in an amount of from 1 to 10 $g/m^3$ of wastewater.

6. The process of claim 1 wherein the fat- or dye-soiled material is a dye-soiled material.

7. The process of claim 6 wherein the compound of (g) is an oxidizing agent.

8. The process of claim 7 wherein the oxidizing agent is ozone.

9. The process of claim 1 wherein the aqueous detergent-containing liquor of (b) and rinse water of (d) contain at least 80% by weight of treated wastewater from (k).

10. The process of claim 1 wherein the aqueous detergent-containing liquor contain from 1 to 5% by weight of detergent, based on the weight of the fat- or dye-soiled material.

11. The process of claim 1 further comprising after-treating the treated wastewater of (j), prior to recirculating it, by flocculation using a flocculation aid.

12. The process of claim 11 wherein the flocculation aid is an anionically modified polyacrylamide.

13. The process of claim 11 wherein the flocculation aid is employed in a quantity of from 0.1 to 2 $g/m^3$ of wastewater.

14. The process of claim 1 wherein the rinsed material of (e) is rinsed an additional 3 to 6 times with the rinse water of (d), thus forming additional rinse wastewater.

15. The process of claim 14 wherein the additional rinse wastewater is collected in an equalization tank and combined with the chemically pretreated wash and rinse wastewater of (g).

* * * * *